(12) United States Patent
Seo et al.

(10) Patent No.: US 12,307,137 B2
(45) Date of Patent: May 20, 2025

(54) REMOTE MANAGEMENT SERVER TO GENERATE POLICY FOR MANAGING IMAGE FORMING APPARATUSES AND CONTROL OF CONFIGURATION DATA OF IMAGE FORMING APPARATUSES

(71) Applicant: Hewlett-Packard Development Company, L.P., Spring, TX (US)

(72) Inventors: Giwon Seo, Seongnam Si (KR); Junghun Kim, Seongnam Si (KR); Byeongju Hwang, Seongnam Si (KR); Sangmi Kim, Seongnam Si (KR); Minyoung Son, Pangyo (KR); Hyungjong Kang, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/562,443

(22) PCT Filed: Nov. 17, 2021

(86) PCT No.: PCT/US2021/059628
§ 371 (c)(1),
(2) Date: Nov. 20, 2023

(87) PCT Pub. No.: WO2022/250728
PCT Pub. Date: Dec. 1, 2022

(65) Prior Publication Data
US 2024/0184491 A1 Jun. 6, 2024

(30) Foreign Application Priority Data
May 25, 2021 (KR) ........................ 10-2021-0067114

(51) Int. Cl.
*G06F 3/12* (2006.01)
*H04N 1/00* (2006.01)

(52) U.S. Cl.
CPC .......... *G06F 3/1204* (2013.01); *G06F 3/1285* (2013.01); *H04N 1/00344* (2013.01);
(Continued)

(58) Field of Classification Search
None
See application file for complete search history.

(56) References Cited

U.S. PATENT DOCUMENTS 8,755,937 B2  6/2014 Kim
9,723,024 B2  8/2017 Hagiuda
(Continued)

FOREIGN PATENT DOCUMENTS

JP  2007-087232 A  4/2007
JP  2013-008173 A  1/2013
(Continued)

*Primary Examiner* — Haris Sabah
(74) *Attorney, Agent, or Firm* — Brooks, Cameron & Huebsch, PLLC

(57) ABSTRACT

An example remote management server is to generate a policy including configuration data for image forming devices and a list of a plurality of image forming devices for which the configuration data is applied, configure the plurality of image forming devices with the configuration data according to the policy, receive, from a service provider device for managing the plurality of image forming devices, a request for a change in configuration data for an image forming device, and, if the image forming device is included in the list, process the request according to a preset rule.

15 Claims, 13 Drawing Sheets

(52) U.S. Cl.
CPC ....... *H04N 1/00973* (2013.01); *G06F 3/1254* (2013.01); *G06F 3/1255* (2013.01); *H04N 2201/0094* (2013.01)

(56) References Cited

U.S. PATENT DOCUMENTS

| | | | |
|---|---|---|---|
| 10,027,713 B2* | 7/2018 | Shimizu | H04L 63/20 |
| 2015/0046970 A1 | 2/2015 | Shimizu | |
| 2015/0109629 A1* | 4/2015 | Takeda | H04N 1/4433 |
| | | | 358/1.13 |
| 2016/0014161 A1* | 1/2016 | Sato | H04L 63/083 |
| | | | 726/1 |
| 2017/0098066 A1* | 4/2017 | Haba | H04L 63/0428 |
| 2018/0084133 A1 | 3/2018 | Kawai | |
| 2018/0152482 A1* | 5/2018 | Shimizu | G06F 21/6218 |

FOREIGN PATENT DOCUMENTS

| | | |
|---|---|---|
| JP | 2017-188121 A | 10/2017 |
| KR | 10-1450250 B1 | 10/2014 |

\* cited by examiner

FIG.2

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device a, Device b, Device c, ... ]
}
```

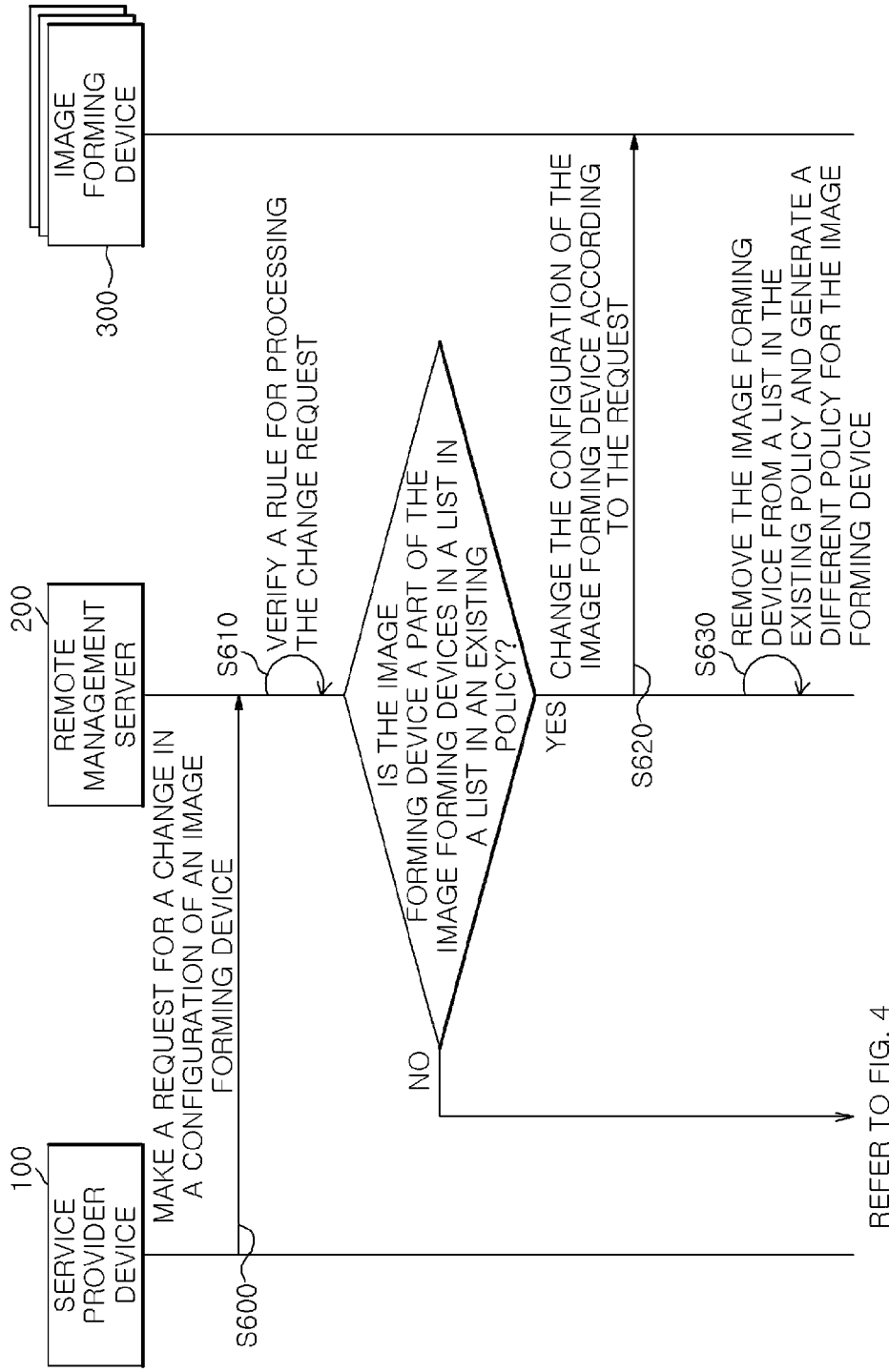

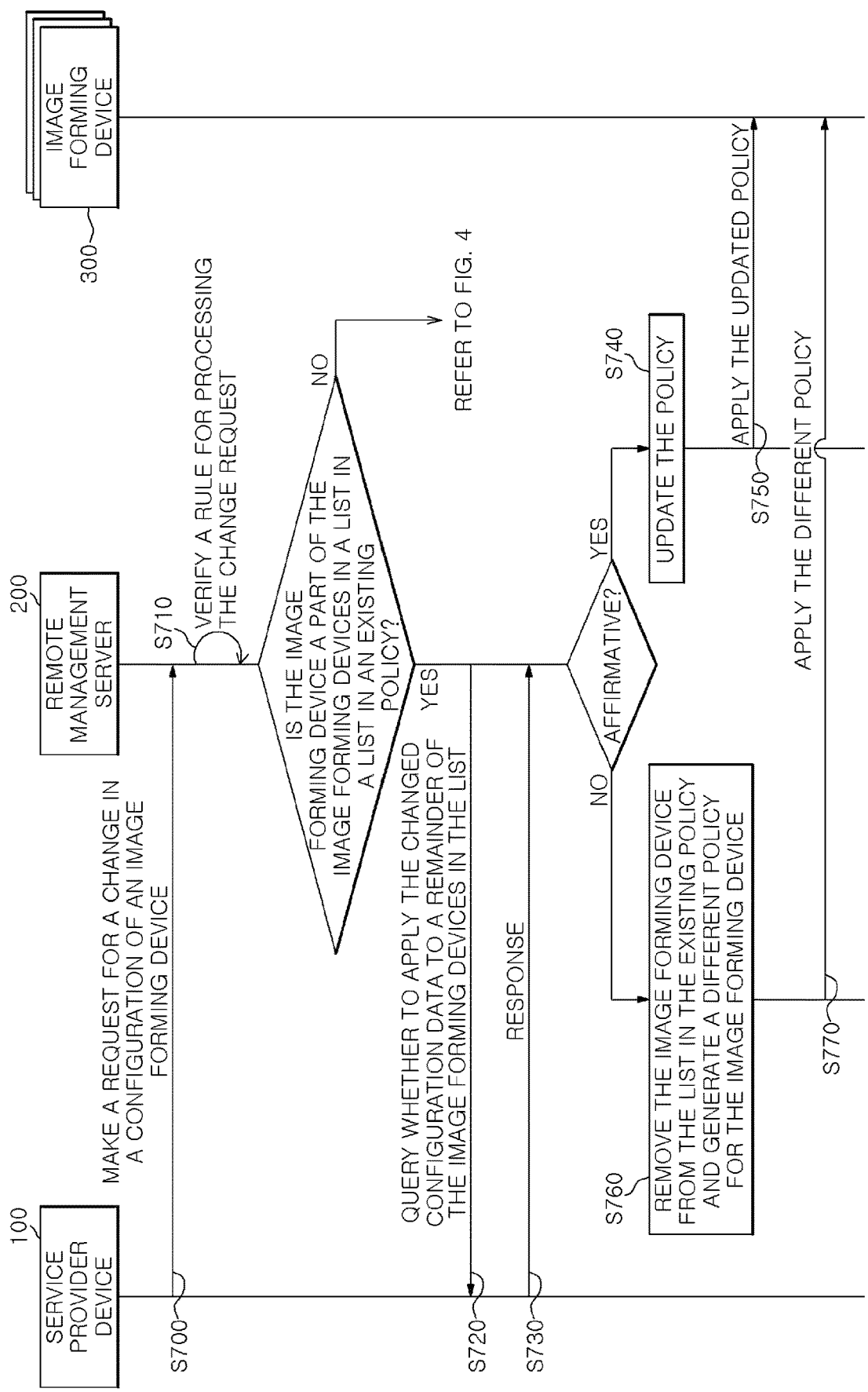

FIG.8

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device a, Device b, Device c, ... ]
}
```

```
Policy A : {
  policyName : "Policy A",
  attributeList : [
    { type : property1, value : true },
    { type : property2, value : false },
    { type : App, value : [ name : App 1, appConfig : {Option1 : 300dpi, Option2 : Color, ...}]},
    { type : App, value : [ name : App 2, appConfig : {Option1 : 100dpi, Option2 : Color, ...}]},
  ],
  deviceResourceIdList : [Device b, Device b, Device c, ... ]
}
```

FIG. 9

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device a, Device b, Device c, ... ]
}
```

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device b, Device c, ... ]
}
```

FIG.14

Policy A
 NOTE: POLICY FOR DEVICE MANAGEMENT FOR CLIENT A
 TIME POINT OF APPLICATION: 2:00 A.M. AT THE END OF EACH MONTH

POLICY SETTINGS

○ REJECT THE REQUESTED CHANGE
● ACCEPT THE REQUESTED CHANGE (UPDATE THE POLICY IF THE REQUEST IS TO RECONFIGURE ALL THE LISTED DEVICES)
　○ ACCEPT THE REQUESTED CHANGE AND REMOVE THE DEVICE(S) FROM THE POLICY
　○ ACCEPT THE REQUESTED CHANGE, REMOVE THE DEVICE(S) FROM THE POLICY, AND GENERATE A NEW POLICY
　○ ACCEPT THE REQUESTED CHANGE AND MAKE A REQUEST FOR VERIFICATION OF WHETHER TO APPLY THE CHANGE TO ALL OF THE LISTED DEVICES

REMOTE MANAGEMENT SERVER TO GENERATE POLICY FOR MANAGING IMAGE FORMING APPARATUSES AND CONTROL OF CONFIGURATION DATA OF IMAGE FORMING APPARATUSES

BACKGROUND

There exist many different types of image forming devices, including dedicated printers, scanners, copiers, facsimile machines, etc., and also multi-function products (MFPs) that act as an all-in-one solution to provide a combination of, e.g., printing, copying, scanning, and faxing functions.

In this connection, an image forming device may change its device settings to adjust its functionality and may also be utilized with a number of applications installed therein, each of which can change and use a setting value.

BRIEF DESCRIPTION OF THE DRAWINGS

Various examples will be described below by referring to the following figures.

FIG. 2 is a diagram depicting a policy, according to an example.

FIGS. 3 to 7 are flow diagrams, each of which illustrates processing of a separate request for a change in a configuration of an image forming device to which a policy is applied, according to an example.

FIGS. 8 to 10 are diagrams depicting changes in a policy, according to various examples.

FIG. 14 is a schematic illustration of a user interface of a service provider device, according to an example.

DETAILED DESCRIPTION

Figure 1:
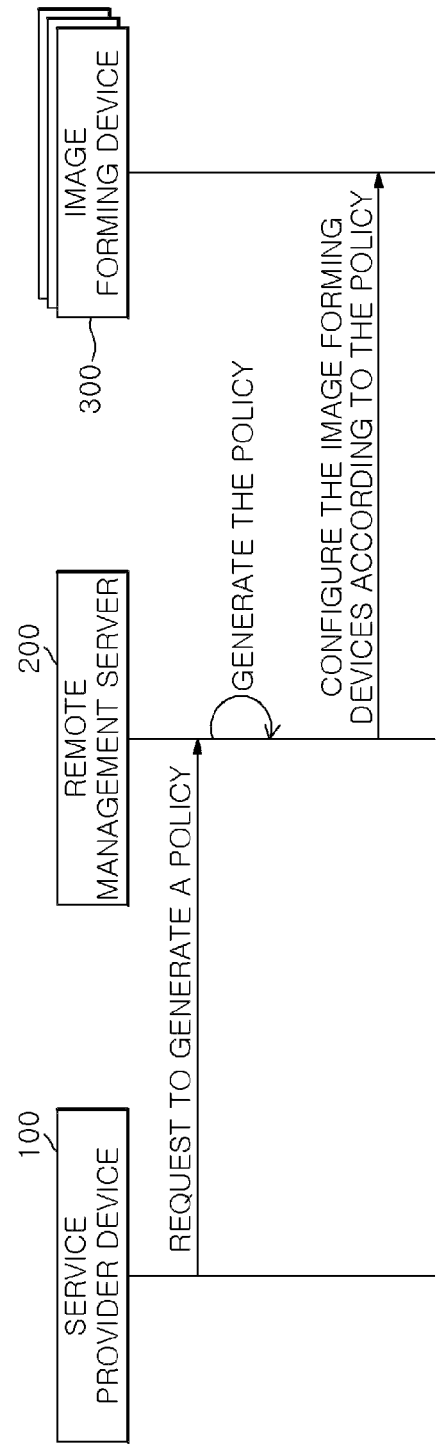
FIG. 1 is a diagram conceptually depicting a system, including a service provider device, a remote management server, and a plurality of image forming devices, where a policy is applied to manage configuration data for the image forming devices, according to an example.

In various examples of the present disclosure, a service provider, for example, a reseller, may manage a plurality of image forming devices by placing, into a policy, configuration data including setting information for each of the plurality of image forming devices, a list of applications to be installed in each of the image forming devices, and setting information for each of the applications. This policy may be generated, changed, and distributed by a remote management server which is coupled with the plurality of image forming devices.

Based on the service provider managing the plurality of image forming devices by using his/her service provider device or the remote management server to apply identical configuration data to each of the plurality of image forming devices, the application of the configuration data is not performed on a one-by-one basis. Rather, the policy may be generated from a list of the targeted image forming devices and the same configuration data to be applied thereto, and the listed targeted image forming devices may be configured all together with the configuration data in accordance with the policy. For the plurality of image forming devices, the same configuration data may be maintained in a dynamic fashion by application of the generated policy to those image forming devices at, for example, certain time points or intervals.

Further, with such dynamic policy function employed to manage the plurality of image forming devices, a request may be made for a change in the configuration data for an individual one of the plurality of image forming devices. However, if made without regard to the policy, the change might be overwritten with application of the policy to that device. The conflict between the policy and the change request might otherwise result in a failure of the dynamic policy function.

Examples described herein provide for processing of a request for a change in configuration data for an individual one of a plurality of image forming devices to which a policy is applied for their integrated management.

Various terms used in the present disclosure are chosen from a terminology of commonly used terms in consideration of their function herein, which may be appreciated differently depending on an intended implementation, a precedent case, or an emerging new technology. In certain instances, some terms are to be construed as set forth in detail in the detailed description. Accordingly, the terms used herein are to be defined consistently with their meanings in the context of the present disclosure, rather than simply by their plain and ordinary meaning.

The terms "comprising." "including," "having," "containing," etc. are used herein to specify the presence of the elements listed thereafter. Unless otherwise indicated, these terms and variations thereof are not meant to exclude the presence or addition of other elements.

As used herein, the ordinal terms "first." "second," and so forth are meant to identify several similar elements. Unless otherwise specified, such terms are not intended to impose limitations, e.g., a particular order of these elements or of their use, but rather are used merely for referring to multiple elements separately. For instance, an element may be referred to in an example with the term "first" while the same element may be referred to in another example with a different ordinal number such as "second," "third," etc. In such examples, such ordinal terms are not to limit the scope of the present disclosure. Also, the use of the term "and/or" in a list of multiple elements is inclusive of all possible combinations of the listed items, including any one or a plurality of the items.

The term "image forming job" as used herein may encompass any of a variety of image-related jobs that involve an operation of forming an image and/or other processing operations, e.g., creation, generation, and/or transfer of an image file. The term "job" as used herein may encompass a chain of processes that facilitate an image forming job, as well as the image forming job per se. By way of example and not limitation, an image forming device may perform an image forming job, such as a print job, a copy job, a scan job, a facsimile, or other transmission job, a storage job, a coating job, or the like.

The term "image forming device" or "image forming apparatus" as used herein may encompass any of a variety of devices, such as a printer, a copier, a scanner, a facsimile machine, a multi-function product (MFP), a display device, and the like, that is capable of performing an image forming job. In some examples, an image forming device may be a two-dimensional (2D) or a three-dimensional (3D) image forming device. Such image forming device may provide various additional functions, as well as basic ones, for example, print, copy, and scan functions.

The term "user" as used herein may refer to a person who manipulates an image forming device to perform an image forming job. Further, the term "administrator" as used herein may refer to a person who has access to the entire functionality of an image forming device. In some examples, one person may have both roles of an administrator and user.

The term "service provider" as used herein may refer to a person who supplies an image forming device to a user and has control of the functions and settings of the image forming device. By way of example and not limitation, a service provider may be a reseller who lends a plurality of image forming devices to a particular user or group, applies device setting values of the plurality of image forming devices according to an established contract, and controls and manages installation of an application and a setting value of the application.

The terms "electronic device," "electronic apparatus," or "user device" as used herein may refer to any information processing device, such as, for example, a computer, a laptop, a table PC, a mobile telephone terminal, or the like, that may be used by a user.

Examples of the present disclosure will now be described with reference to the accompanying drawings. The present disclosure may, however, be embodied in many different forms and should not be construed as limited to the examples set forth herein. Rather, these examples are given in order to provide a better understanding of the scope of the present disclosure.

FIG. 1 is a diagram conceptually depicting a system, including a service provider device, a remote management server, and a plurality of image forming devices, where a policy is applied to manage configuration data of the image forming devices, according to an example.

Referring to FIG. 1, a service provider such as a reseller may make a request to a remote management server 200, which may configure a plurality of image forming devices, for generation of a policy, so as to configure and manage the plurality of image forming devices with identical configuration data. For example, the service provider may request, by way of the service provider device 100, the remote management server 200 to generate a policy including configuration data for image forming devices and a list of a plurality of image forming devices, e.g., a plurality of image forming devices 300, for which the configuration data is to be applied. In these examples, the configuration data may include setting information for each image forming device, a list of applications to be installed in each image forming device, and setting information for each application. The remote management server 200 may generate a policy as requested and apply the generated policy to the plurality of image forming devices 300 in the list to configure each of the image forming devices 300 with the configuration data specified in the policy.

Further, the service provider may set a periodic interval of time, or a point in time, at which the policy is to be applied to the image forming devices 300. In other words, a job of configuring the image forming devices 300 with the configuration data in accordance with the policy may be performed upon generation of the policy, and/or repeatedly at certain time intervals or points. For example, the service provider may specify that the policy is to be consistently applied to the image forming devices 300 at daily or weekly intervals. Accordingly, if the service provider changes the policy, the new policy may be applied to each of the listed image forming devices 300 at a specific time point so that the service provider may maintain those devices with the recent configuration data without performing a job on the devices in a one-by-one manner.

In addition, or alternatively, the remote management server 200 may manage the image forming devices 300 in a dynamic fashion by, for example, receiving, from the image forming devices 300, the currently set configuration data at a certain periodic interval or time point, or upon request by the service provider, comparing the received configuration data to the configuration data incorporated in the policy, and if it is determined based on a result of the comparison that there is a difference in the compared data, configuring the image forming devices 300 with the configuration data corresponding to the policy.

Further, based on receiving a request for onboarding of a new image forming device, the remote management server 200 may verify whether the new image forming device is one that appears in the list included in the policy. By way of example and not limitation, this may be performed by verifying whether an identifier of the new image forming device is among identifiers of the image forming devices that are included in the policy and are thus subject to management. By way of example and not limitation, the onboarding request may be made based on an existing image forming device being initialized and installed again or based on a new image forming device being provided by the service provider. For example, if a new image forming device is sold to a user by contract, the service provider may simply update the list of targeted image forming devices, included in the policy, so as to configure the new image forming device, together with those existing ones, with the same configuration data and continue to facilitate integrated management of the devices.

FIG. 2 is a diagram depicting a policy, according to an example.

Referring to FIG. 2, Policy A may define a setting value for a particular property of an image forming device. For example, FIG. 2 illustrates that property1 and property2 are set to true. By way of example and not limitation, a property may include a variety of attribute information such as ON/OFF settings of a power saving mode, a lockout mode, a fax function of the image forming device, etc. Further, Policy A may define a list of applications installed in the device and a setting value of each application. In the example of FIG. 2, the setting values for Apps 1 and 2 respectively indicate a 300 dpi resolution in a color mode and a 200 dpi resolution in a monochrome mode. Still further, Policy A may define a list of devices for which the above-mentioned property values are to be applied. In the example of FIG. 2, Device a, Device b, Device c, . . . denotes a list of image forming devices to which Policy A is to be applied.

FIGS. 3 to 7 are flow diagrams, each of which illustrates processing of a separate request for a change in a configuration of an image forming device to which a policy is applied, according to an example.

It is contemplated that based on the remote management server 200 generating and distributing a policy to manage configuration data for the plurality of image forming devices 300 included in a list in the policy, the service provider device 100 may be used by a service provider to attempt to change a configuration of an individual one of the plurality of image forming devices in a manner other than by changing the policy. The configuration change requested in this separate way, if made without regard to the policy currently in effect, might be cancelled with application of the policy to the device. In another example, where the policy is still supposed to be applied to the image forming device, the service provider may make the separate configuration change request without checking whether the policy is applied thereto. In examples of the present disclosure, a request "separately" made for a configuration change may refer to an attempt to change configuration data for an image forming device in a direct manner, rather than by changing a policy through which the device comes under management. Accordingly, in conjunction with application of the policy to the image forming device, certain techniques are to be considered for processing of the separate configuration change request.

In the following description, a separate request is described as being made for a change in the configuration data for one of the plurality of image forming devices. It is to be understood that, in the following examples, the separate request may also be made for two or more of the plurality of image forming devices. For brevity of description, the request will be described as being made for one of the plurality of image forming devices, but the description is not limited thereto.

In various examples where the separate request is made for a change in the configuration data for one of the plurality of image forming devices, the remote management server 200 may process the separate configuration change request according to at least one of the following rules:

a rule for rejecting the requested change in the configuration data for the image forming device; or a rule for accepting the requested change in the configuration data for the image forming device, where:

the rule for accepting the requested change is set as a first rule for updating the policy with the changed configuration data based on the image forming device corresponding to all of the plurality of image forming devices (e.g., the request is made for a change in the configuration data for all of the plurality of image forming devices); and the rule for accepting the requested change is set as at least one of the following based on the image forming device being a part of the plurality of image forming devices (e.g., the request is made for a change in the configuration data for fewer than all of the plurality of image forming devices), a second rule for accepting the requested change in the configuration data for the image forming device and updating the policy to remove the image forming device from the list;

a third rule for accepting the requested change in the configuration data for the image forming device, updating the policy to remove the image forming device from the list, and generating a different policy corresponding to the changed configuration data and the removed image forming device; or a fourth rule for accepting the requested change in the configuration data for the image forming device and querying the service provider device whether to apply the changed configuration data to a remainder of the plurality of image forming devices.

Now, some of these examples are described in more detail below.

Figure 3:
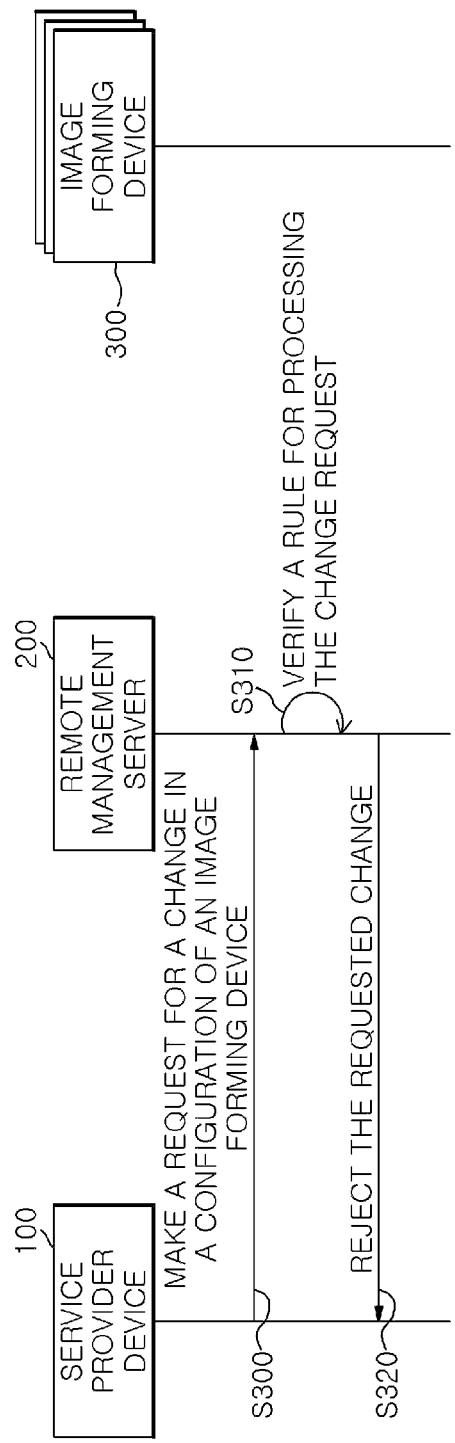

FIG. 3 is a flow diagram illustrating processing a separate request for a configuration change to an image forming device based on the rule for rejecting the requested change being applied, according to an example.

Referring to FIG. 3, a service provider makes a request through the service provider device 100, which is used for management of the plurality of image forming devices 300, for a change in a configuration of one of the plurality of image forming devices 300 at operation S300. The requested configuration change to the image forming device may include, for example, a change of a property value of the device, an installation of an additional application in the device, a removal of an application installed in the device, a change of a property value of an application installed in the device, and the like.

The remote management server 200 receives the change request and determines whether the received change request is to reconfigure the image forming device 300 being currently managed through a policy. If the change request is not to reconfigure the image forming device 300 currently under the policy-based management, this process flow may end with processing the change request accordingly. Further details thereof are not set forth herein for the sake of brevity.

If it is determined that the change request is to reconfigure the image forming device 300 that appears in a list of targeted devices which is included in the currently applied policy, the remote management server 200 verifies a rule currently in use for processing a separate configuration change request at operation S310. In the illustrated example, the remote management server 200 verifies that the currently applied rule is the rule for rejecting the requested change.

At operation S320, the remote management server 200 rejects the requested configuration change according to the currently applied rule. Additionally, the service provider device 100 may notify the service provider, for example, through a display of the service provider device 100, that the configuration of the image forming device is prohibited under the currently applied policy from being changed and that any change in the configuration requires a change of the policy.

Figure 4:
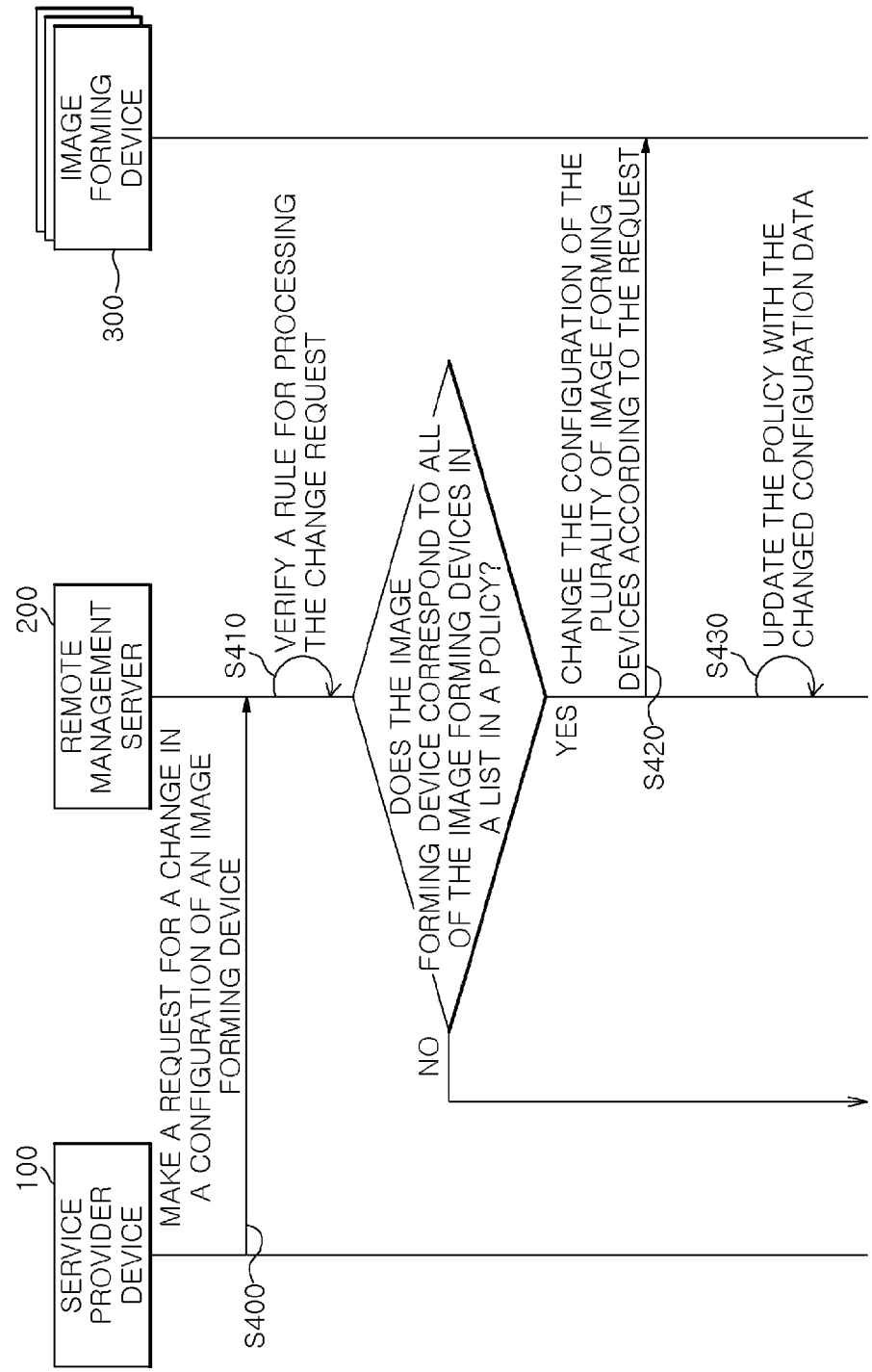

FIG. 4 is a flow diagram illustrating processing a separate request for a configuration change to an image forming device based on the first rule being applied, according to an example.

Referring to FIG. 4, a service provider makes a request for a change in a configuration of the image forming device 300 at operation S400. At operation S410, the remote management server 200 receives the change request, determines whether the received change request is to reconfigure the image forming device 300 being currently managed through a policy, and verifies a rule currently in use for processing a separate configuration change request. For further details, reference may be made to the above description.

In the example of FIG. 4, the remote management server 200 verifies that the currently applied rule is the rule for accepting the requested change and determines whether the image forming device, which is requested to be reconfigured, corresponds to all of the plurality of image forming devices 300 listed in the policy (e.g., the request is made for a change in the configuration data for all of the plurality of image forming devices).

If it is determined that the image forming device corresponds to all of the plurality of image forming devices 300, the first rule for updating the policy with the changed configuration data is applied. At operation S420, the remote management server 200 applies the changed configuration data to the plurality of image forming devices, which are requested to be reconfigured. At operation S430, the remote management server 200 updates the currently applied policy with the changed configuration data. In other words, as all of the plurality of image forming devices 300 are managed through the policy and requested to be reconfigured with the same change, the remote management server 200 may treat the separate configuration change request as a request to change the policy.

FIG. 8 illustrates a change in a policy based on the policy being updated according to this rule, according to an example.

Referring to FIG. 8, Policy A has a target device list in which Devices a, b and c are included before the change is made. In the example, where a request is separately made for a change in configuration data for Devices a, b and c, which correspond to all of the devices in the target device list included in Policy A, the remote management server 200 updates Policy A such that the configuration data in Policy A is updated accordingly. The example of FIG. 8 shows that in Policy A, the value of property2 is changed from true to false and the setting of App 2 is changed from a 200 dpi resolution in a monochrome mode to a 100 dpi in a color mode.

Figure 5:
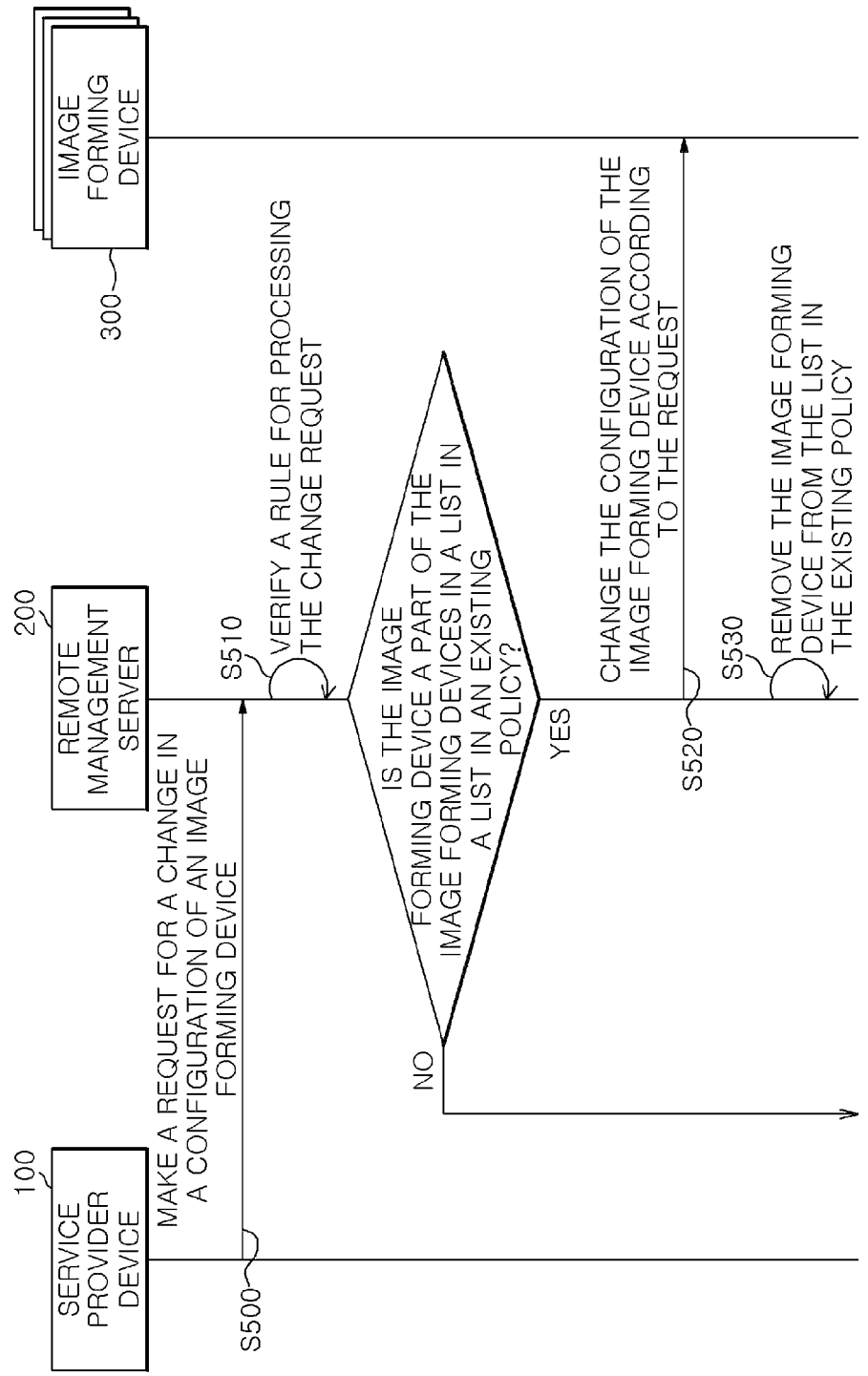

FIG. 5 is a flow diagram illustrating processing a separate request for a configuration change to an image forming device based on the second rule being applied, according to an example.

Referring to FIG. 5, a service provider makes a request for a change in a configuration of one of the image forming devices 300 at operation S500. At operation S510, the remote management server 200 receives the change request, determines whether the received change request is to reconfigure the image forming device 300 being currently managed through a policy, and verifies a rule currently in use for processing a separate configuration change request. For further details, reference may be made to the above description.

In an example, the remote management server 200 verifies that the currently applied rule is the rule for accepting the requested change and determines whether the image forming device, which is requested to be reconfigured, corresponds to all of the plurality of image forming devices 300 included in a target device list incorporated in the policy.

In the example of FIG. 5, unlike the example of FIG. 4, the remote management server 200 determines that the image forming device is a part of (e.g., fewer than all of) the plurality of image forming devices 300 in the list. The remote management server 200 verifies that the second rule is applied for accepting the requested change in the configuration data for the image forming device and updating the policy to remove the image forming device from the list. At operation S520, the remote management server 200 changes the configuration of the image forming device 300 based on the received change request for, e.g., a change of the power saving mode of the device from ON to OFF. At operation S530, the remote management server 200 updates the policy to remove the image forming device from the list of targeted image forming devices 300 which is defined in the currently applied policy. That is, the image forming device is not now managed through the policy.

FIG. 9 illustrates a change in a policy based on the policy being updated according to the second rule, according to an example.

Referring to FIG. 9, Policy A has a target device list in which Device a is included before the change is made. In the example, where a request is separately made for a change in configuration data for Device a, and processed according to the second rule, Policy A is updated such that Device a is removed from the target device list.

FIG. 6 is a flow diagram illustrating processing a separate request for a configuration change to an image forming device based on the third rule being applied, according to an example.

Referring to FIG. 6, a service provider makes a request for a change in a configuration of one of the image forming devices 300 at operation S600. At operation S610, the remote management server 200 receives the change request, determines whether the received change request is to reconfigure the image forming device 300 being currently managed through a policy, and verifies a rule currently in use for processing a separate configuration change request. For further details, reference may be made to the above description.

In an example, the remote management server 200 verifies that the currently applied rule is the rule for accepting the requested change and determines whether the image forming device, which is requested to be reconfigured, corresponds to all of the plurality of image forming devices 300 included in a target device list incorporated in the policy.

In this example, unlike the example of FIG. 4, the remote management server 200 determines that the image forming device is a part of (e.g., fewer than all of) the plurality of image forming devices 300 in the list. The remote management server 200 verifies that the third rule is applied for accepting the requested change in the configuration data for the image forming device, update the policy to remove the image forming device from the list, and generates a different policy corresponding to the changed configuration data and the removed image forming device. At operation S620, the remote management server 200 changes the configuration of the image forming device 300 based on the received change request for, e.g., a change of the power saving mode of the device from ON to OFF. At operation S630, the remote management server 200 updates the policy to remove the image forming device 300 from the list of targeted image forming devices which is defined in the currently applied policy, and also generates the different policy for the removed image forming device 300. That is, the image forming device 300 is now managed through the newly generated policy, rather than through the existing policy. The newly generated policy may include new configuration data in which the request for a change of a property value contained in the configuration data defined in the existing policy is reflected and may also include the image forming device as a targeted image forming device.

Figure 10:
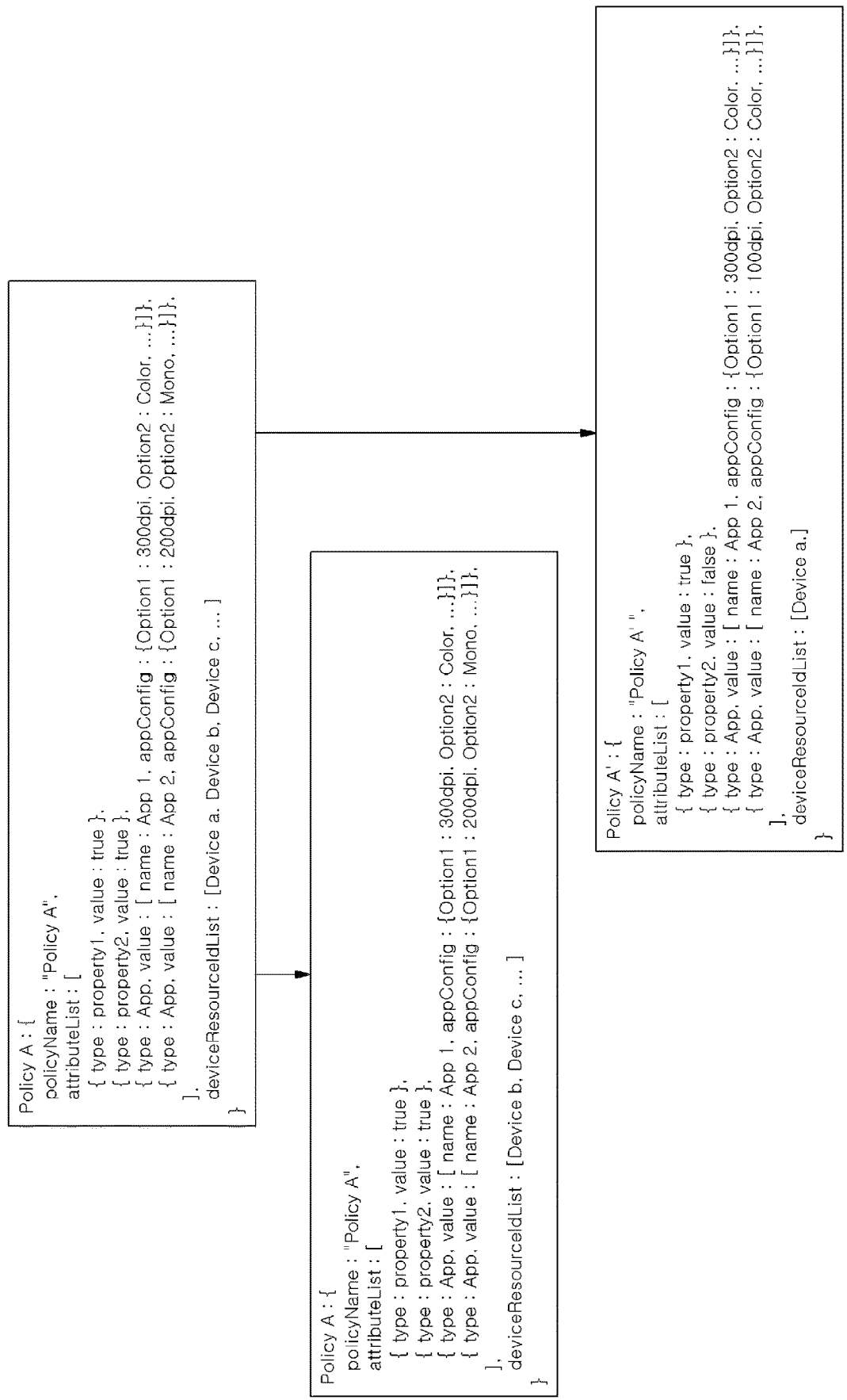

FIG. 10 illustrates a change in a policy based on the policy being updated according to the third rule.

Referring to FIG. 10, Policy A has a target device list in which Device a is included before the change is made. In the example, where a request is separately made for a change in configuration data for Device a, and processed according to the second rule, Policy A is then updated such that Device a is removed from the target device list. In addition, a new policy, i.e., Policy A', is generated for Device a. Policy A' is generated to have the configuration data redefined with a property value such that the value is a changed one if requested as such and otherwise an original one. The example of FIG. 10 shows that Policy A' is generated for Device a, with the value of property2 changed from true to false, and with the setting of App 2 changed from a 200 dpi resolution in a monochrome mode to a 100 dpi resolution in a color mode.

FIG. 7 is a flow diagram illustrating processing a separate request for a configuration change to an image forming device based on the fourth rule being applied, according to an example.

Referring to FIG. 7, a service provider makes a request for a change in a configuration of one of the image forming devices 300 at operation S700. At operation S710, the remote management server 200 receives the change request, determines whether the received change request is to reconfigure the image forming device 300 being currently managed through a policy, and verifies a rule currently in use for processing a separate configuration change request. For further details, reference may be made to the above description.

In an example, the remote management server 200 verifies that the currently applied rule is the rule for accepting the requested change and determines whether the image forming device, which is requested to be reconfigured, corresponds to all of the plurality of image forming devices 300 included in a target device list incorporated in the policy (e.g., the request is made for a change in the configuration data for all of the plurality of image forming devices).

In the example of FIG. 7, unlike the example of FIG. 4, the remote management server 200 determines that the image forming device is a part of (e.g., fewer than all of) the plurality of image forming devices 300 in the list. The remote management server 200 verifies that the fourth rule for accepting the requested change in the configuration data for the image forming device and querying the service provider device 100 whether to apply the changed configuration data to a remainder of the plurality of image forming devices in the list.

At operation S720, the remote management server 200 may request the service provider device 100 to verify whether to apply the change in the configuration data for the image forming device, for example, a change of a property value of the image forming device, an installation of an additional application in the image forming device, a removal of an application installed in the one image forming device, a change of a property value of an application installed in the image forming device, and the like, to any other image forming devices in the list (i.e., a remainder) as well. At operation S730, the service provider device 100 transmits, to the remote management server 200, a response to the verification. For example, the service provider device 100 receives the response from the service provider and transmits the response to the remote management server 200.

If the received response is affirmative, the remote management server 200 updates the policy to apply the changed configuration data to the other image forming devices such that the changed configuration data is in turn applied for all of the plurality of image forming devices 300 in the list at operation S740. At operation S750, the remote management server 200 applies the updated policy to the plurality of image forming devices 300 to configure the image forming devices 300 with the changed configuration data.

If the received response is negative, the remote management server 200 updates the policy to remove the image forming device 300 from the list of targeted image forming devices, which is defined in the currently applied policy, and also generates a different policy for the removed image forming device 300 at operation S760. That is, at S770, the image forming device 300 is now managed through the newly generated policy, rather than through the existing policy. As described above with respect to the third rule, the newly generated policy may include new configuration data in which the request for a change of a property value contained in the configuration data defined in the existing policy is reflected and may also include the image forming device as a targeted image forming device.

The foregoing demonstrates that if a service provider such as a reseller uses a dynamic policy function to manage a plurality of image forming devices, the service provider device 100 may receive a request for a change in a configuration of an image forming device and that the separate configuration change request may be processed according to a preset rule, for example, any one of the above-mentioned rules, such that in conjunction therewith, the underlying policy is changed on an as-needed basis. As such, the separate configuration change request may be employed in parallel with the policy-based management of the plurality of image forming devices. Further, the service provider may adopt, on an as-needed basis, an indirect approach to changing the policy by way of, for example, making the separate configuration change request.

Figure 11:
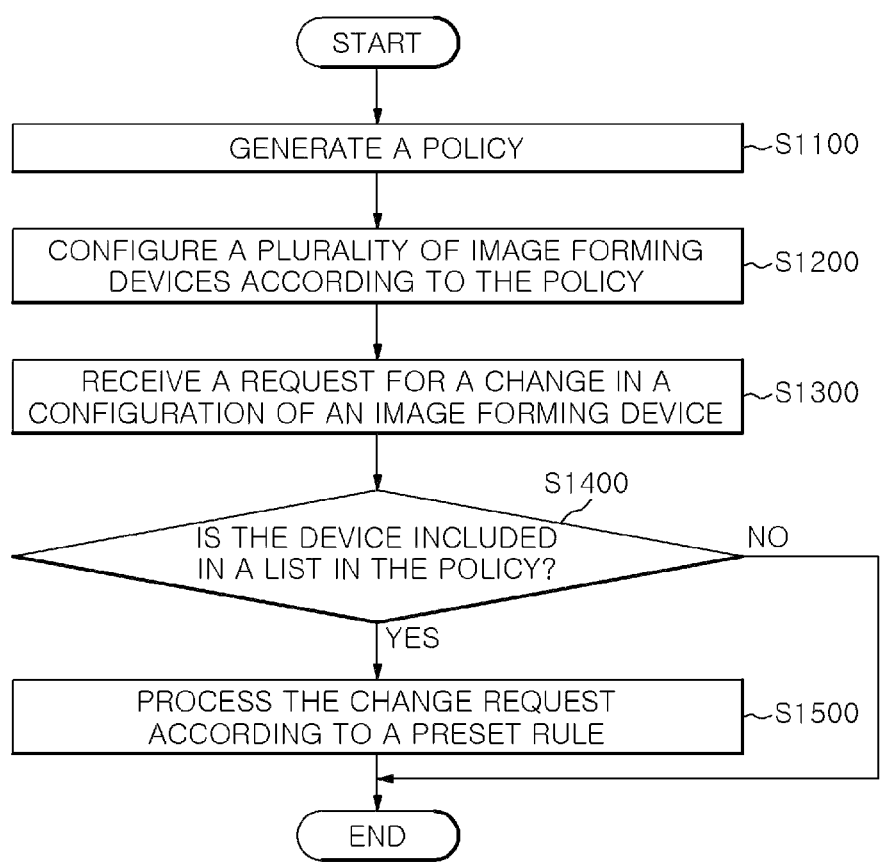
FIG. 11 is a flow diagram illustrating a method of processing a separate request for a change in a configuration of an image forming device to which a policy is applied, according to an example.

FIG. 11 is a flow diagram illustrating a method of processing a separate request for a change in a configuration of an image forming device to which a policy is applied, according to an example.

Referring to FIG. 11, the remote management server 200 generates a policy including configuration data for image forming devices and a list of a plurality of image forming devices 300 for which the configuration data is to be applied at operation S1100.

At operation S1200, the remote management server 200 configures the plurality of image forming devices 300 with the configuration data according to the policy. This job of configuring the image forming devices 300 may be performed upon generation of the policy, and/or repeatedly at certain time intervals or points. For example, the service provider may specify that the policy is to be consistently applied to the image forming devices 300 at daily or weekly intervals. Accordingly, if the service provider changes the policy, the new policy may be applied to the listed image forming devices 300 all at a specific time point so that the service provider may maintain those devices with the recent configuration data without performing a job on the devices in a one-by-one manner.

In addition, or alternatively, the remote management server 200 may manage the image forming devices 300 in a dynamic fashion by, for example, receiving, from the image forming devices 300, the currently set configuration data at a certain periodic interval or time point, or upon request by the service provider, comparing the received configuration data to the configuration data incorporated in the policy, and if it is determined based on a result of the comparison that there is a difference in the compared data, configuring the image forming devices 300 with the configuration data corresponding to the policy.

At operation S1300, the remote management server 200 receives, from a service provider device that manages a plurality of image forming devices, a request for a change in the configuration data for one of the plurality of image forming devices.

At operation S1400, the remote management server 200 determines whether the image forming device, the configuration data for which is requested to be changed, is included in the list in the policy stored in the remote management server 200. Operation S1400 may include determining whether the image forming device, which is requested to be reconfigured, corresponds to all of the plurality of image forming devices. As discussed above, if the image forming device corresponds to all of the plurality of image forming devices, a rule for accepting the requested change, for example, the first rule, may be treated as a request to change the policy. If the image forming device is a part of (e.g., fewer than all of) the plurality of image forming devices, the separate configuration change request may be processed according to a certain rule, for example, any one of the second to the fourth rules.

At operation S1500, the remote management server 200 processes the request for the change in the configuration data according to a preset rule. For examples on the types of the preset rules and the relevant operations, reference may be made to the description provided above with respect to FIGS. 3 to 10.

The example method may further include an operation of performing, based on the policy being updated, a backup of the policy prior to the update.

For example, the method may include an operation of performing, based on the third rule being applied, a backup of the policy before updating the policy to remove the image forming device, which is requested to be reconfigured, from the list of targeted devices to which the policy is applied. In another example, the method may include an operation of performing a backup of the policy based on the fourth rule being applied and if the requested change in the configuration change to the image forming device is also made to the other image forming devices in the list. In still another example, the method may include an operation of performing, based on the first rule being applied, and if the image forming device corresponds to all of the plurality of image forming devices, a backup of the policy before updating the policy. After the policy is changed in line with the reconfiguration of the image forming devices, the backed-up policy may be used for restoring the changed policy to what it was.

Figure 12:
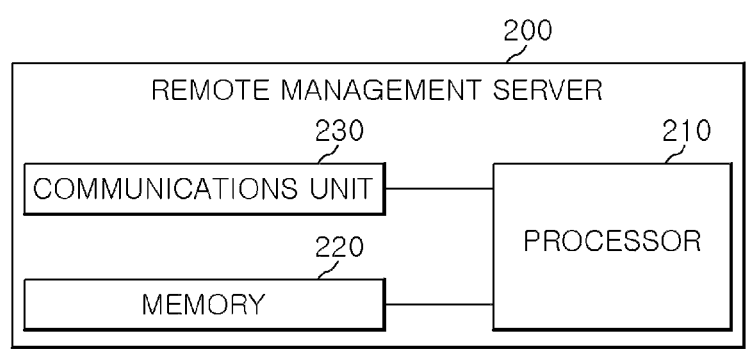
FIG. 12 is a block diagram conceptually illustrating a remote management server, according to an example.

FIG. 12 is a block diagram conceptually illustrating a remote management server, according to an example.

Referring to FIG. 12, the remote management server 200 may include a processor 210, a memory 220, and a communications unit 230. Other implementations are also contemplated. In an example, the remote management server 200 may also include an additional component, e.g., a power supply unit to supply power to the above-mentioned components, a user interface unit, or the like. In another example, the remote management server 200 may include some of, but not all of, the components shown in FIG. 12. Further, the remote management server 200 is not necessarily a single device, but may include a plurality of interconnected devices.

In an example, the processor 210 may control an operation of the remote management server 200. For example, the processor 210 may be implemented with a central processing unit (CPU), a graphics processing unit (GPU), or other processing circuitry to perform example operations as described herein. In an example, the processor 210 may execute an instruction stored in the memory 220. The processor 210 may also read information stored in the memory 220. In addition, the processor 210 may store new information in the memory 220 and may update information stored in the memory 220. For example, the processor 210 may obtain, from the memory 220, information used to control the remote management server 200 or may store such information in the memory 220.

In an example, the memory 220 may include any computer-readable storage medium that stores data in a non-transitory form. For example, the memory 220 may be implemented with Random Access Memory (RAM), Read-Only Memory (ROM), or any other type of storage medium. The memory 220 may have stored therein a variety of information, for example, a set of instructions that may be executed by the processor 210.

In an example, the communications unit 230 may enable the remote management server 200 to communicate with other entities, for example, an image forming device, a service provider device, and the like. The communication unit 230 may include a variety of communications modules, for example, a wired communications module and/or a wireless communications module. For example, the wired communications module may support Local Area Network (LAN), Universal Serial Bus (USB), High Definition Multimedia Interface (HDMI), and any other suitable types of wired communication technologies. For example, the wireless communications module may support Wireless Fidelity (Wi-Fi), Wi-Fi Direct, Bluetooth, Ultra-Wide Band (UWB), Long Term Evolution (LTE), Long Term Evolution-Advanced (LTE-A), Fifth Generation (5G), Near-Field Communication (NFC), and any other suitable types of wireless communication technologies.

In an example, the remote management server 200 may include the processor 210 and the memory 220 having instructions stored therein which, based on execution by the processor 210, cause the processor 210 to operate the remote management server 200.

In an example, based on execution of the instructions, the remote management server 200 is to generate a policy including configuration data for image forming devices and a list of a plurality of image forming devices for which the configuration data is applied, configure the plurality of image forming devices in the list with the configuration data according to the policy, receive, from a service provider device that manages the plurality of image forming devices, a request for a change in configuration data for one of the image forming devices, and, if the image forming device is included in the list, process the request according to a preset rule.

For further details on the types of the preset rules and the relevant operations, reference may be made to the description provided above with respect to FIGS. 3 to 10.

In an example, based on execution of the instructions, the remote management server 200 is further to receive, from the plurality of image forming devices, the currently set configuration data, for example, at a certain periodic interval or time point, or upon request by the service provider, compare the received configuration data to the configuration data incorporated in the policy, and, if it is determined based on a result of the comparison that there is a difference in the compared data, configure the plurality of image forming devices with the configuration data corresponding to the policy.

In an example, based on execution of the instructions, the remote management server 200 is further to, based on receiving a request for onboarding of a new image forming device, verify whether the new image forming device is included in the list incorporated in the policy, and, if the new image forming device is included in the list, apply the policy to the new image forming device.

In an example, based on execution of the instructions, the remote management server 200 is further to perform, based on the policy being updated, a backup of the policy prior to the update.

Figure 13:
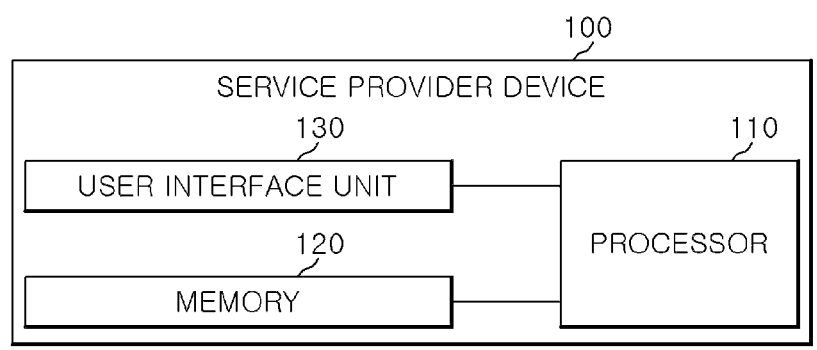
FIG. 13 is a block diagram conceptually illustrating a service provider device, according to an example.

FIG. 13 is a block diagram conceptually illustrating a service provider device, according to an example.

As shown in FIG. 13, the service provider device 100 may include a processor 110, a memory 120, and a user interface unit 130. Other implementations are also contemplated. In an example, the service provider device 100 may also include an additional component, e.g., a power supply unit to supply power to the above-mentioned components, a communications unit to communicate with other entities, or the like. In another example, the service provider device 100 may include some of, but not all of, the components shown in FIG. 13. Further, it may be appreciated that the service provider device 100 is not necessarily a single device, but may include a plurality of interconnected devices.

For further details on the processor 110 and the memory 120, reference may be made to the description provided above with respect to FIG. 12.

In an example, the user interface unit 130 may include an input unit and an output unit. The input unit may be implemented to receive a variety of user inputs. Examples of the input unit include a keyboard, a keypad, a physical button, a touch pad, a touch screen, and the like. The output unit may be implemented to display a result of a job of the service provider device 100 and/or to output or provide a certain message or other information such as a status of the service provider device 100. Examples of the output unit include a display panel, a speaker, and the like.

The input unit may include any other type of device that can receive a variety of inputs and the output unit may include any other type of device that can provide a variety of outputs.

In various examples, the service provider device 100 may include the processor 110 and the memory 120 having instructions stored therein which, based on execution by the processor 110, cause the processor 110 to operate the service provider 100.

In an example, based on execution of the instructions, the service provider device 100 is to transmit, to a remote management server, a request for generation of a policy including configuration data for image forming devices and a list of a plurality of image forming devices for which the configuration data is to be applied. In the course of managing the plurality of image forming devices, for example, setting a configuration of each of the plurality of image forming devices, the service provider may interact with an image forming device in a direct manner or via the remote management server. As discussed above, the service provider may manage the plurality of image forming devices with a policy defined to include configuration data and a list of image forming devices for which the configuration data is to be applied, rather than by setting the plurality of image forming devices on a one-by-one basis. The remote management server may be requested, by the service provider through the service provider device 100, to generate, modify, and distribute the policy. Thus, the service provider can manage the plurality of image forming devices all together, not one by one.

In an example, based on execution of the instructions, the service provider device 100 is further to present a user interface through which a rule for processing a request for a change in the configuration data for the plurality of listed image forming devices is received.

FIG. 14 is a schematic illustration of a user interface of a service provider device, according to an example.

Referring to FIG. 14, based on a reconfiguration of an image forming device managed through a policy being attempted in a separate way, other than by changing the policy, a rule for processing the separate request may be set through a user interface. In an example, the user interface may be presented on an electronic device, e.g., a service provider device, a remote management server, and the like, after it is verified that the device is manipulated by an authorized user to set the rule. Based on receiving, from the service provider device or the individual image forming device, the request for the configuration change to the image forming device, the remote management server may process the request according to the rule. Examples of the rule include the above-mentioned rules. For further examples of these rules, reference may be made to the description provided above with respect to FIGS. 3 to 10. By way of example and not limitation, the example user interface of FIG. 14 may indicate specific information regarding Policy A, such as a note on the policy, a time point of application of the policy, and the like.

Referring again to FIG. 13, the service provider device 100 is further to transmit, based on the processing rule received through the user interface, to the remote management server 200, a request for generation of a preset rule for processing a request for a change in configuration data for the plurality of listed image forming devices.

In an example, the service provider device 100 is further to receive a request for a change in configuration data for one of the plurality of image forming devices. As such, the service provider may use the service provider device 100 to make the change in the configuration of the image forming device, in a manner other than by changing the policy. If that image forming device is not one that is managed through the policy, the configuration change request may be processed accordingly. Further examples thereof are not set forth herein for the sake of brevity. If that image forming device is one that is managed through the policy, the remote management server may process the configuration change request according to the preset rule as discussed in the examples above.

In an example, the methodology disclosed herein may be incorporated into a computer program product. The computer program product may be available as a product for trading between a seller and a buyer. The computer program product may be distributed in the form of a machine-readable storage medium, e.g., compact disc read only memory (CD-ROM), or distributed online through an application store, e.g., PlayStore™. For online distribution, a portion of the computer program product may be temporarily stored, or temporarily created, in a storage medium such as a server of the manufacturer, a server of the application store, or a storage medium such as memory of a relay server.

The foregoing description has been presented to illustrate and describe various examples. It should be understood that many modifications and variations are possible in light of the above description. In various examples, suitable results may be achieved if the above-described techniques are performed in a different order, and/or if some of the components of the above-described systems, architectures, devices, circuits, and the like are coupled or combined in a different manner, or substituted for or replaced by other components or equivalents thereof.

Although the foregoing examples are described in the context of image forming devices, it should be understood that the present disclosure is not limited to such image forming devices and is applicable in other situations where a policy is to be used for management of a plurality of user devices or electronic devices.

Therefore, the scope of the disclosure is not to be limited to the examples as disclosed, but rather defined by the following claims and equivalents thereof.

What is claimed is:
1. A remote management server, comprising:
a processor; and
a memory to store instructions that, based on being executed, cause the processor to:

generate a policy comprising configuration data for image forming devices and a list of a plurality of image forming devices for which the configuration data is to be applied;
configure the plurality of image forming devices with the configuration data according to the policy;
receive, from a service provider device that manages the plurality of image forming devices, a request for a change in configuration data for an image forming device; and
if the image forming device is comprised in the list, process the request according to a preset rule, wherein the preset rule comprises at least one of a rule for rejecting the requested change or a rule for accepting the requested change.

2. The remote management server of claim 1,
wherein the rule for accepting the requested change comprises a first rule for updating the policy with the changed configuration data based on the image forming device corresponding to all of the plurality of image forming devices, and
wherein the rule for accepting the requested change comprises at least one of, based on the image forming device being a part of the plurality of image forming devices:
a second rule for accepting the requested change in the configuration data for the image forming device and updating the policy to remove the image forming device from the list;
a third rule for accepting the requested change in the configuration data for the image forming device, updating the policy to remove the image forming device from the list, and generating a different policy corresponding to the changed configuration data and the removed image forming device; or
a fourth rule for accepting the requested change in the configuration data for the image forming device and querying the service provider device whether to apply the changed configuration data to a remainder of the plurality of image forming devices.

3. The remote management server of claim 2, wherein the fourth rule comprises:
a rule for updating, based on receiving from the service provider device an affirmative response to the query, the policy to apply the changed configuration data to the remainder of the plurality of image forming devices; and
a rule for updating, based on receiving from the service provider device a negative response to the query, the policy to remove the image forming device from the list and generating a different policy corresponding to the changed configuration data and the removed image forming device.

4. The remote management server of claim 2, wherein the preset rule further comprises a rule for performing, based on the policy being updated, a backup of the policy prior to the update.

5. The remote management server of claim 1, wherein the configuration data comprises setting information for each of the plurality of image forming devices, a list of applications to be installed in each of the plurality of image forming devices, and setting information for each of the applications.

6. The remote management server of claim 1, wherein, based on being executed, the instructions further cause the processor to:
receive a request for onboarding of a new image forming device;
verify whether the new image forming device is comprised in the list; and
if the new image forming device is comprised in the list, apply the policy to the new image forming device.

7. The remote management server of claim 1, wherein, based on being executed, the instructions further cause the processor to:
receive, at a particular periodic interval, from the plurality of image forming devices or the service provider device, the configuration data for the plurality of image forming devices;
compare the received configuration data to the configuration data comprised in the policy; and
configure, based on a result of the comparison, the plurality of image forming devices with the configuration data comprised in the policy.

8. A method of managing a configuration of an image forming device, the method comprising:
generating, by a remote management server, a policy comprising configuration data for image forming devices and a list of a plurality of image forming devices for which the configuration data is to be applied;
configuring, by the remote management server, the plurality of image forming devices with the configuration data according to the policy;
receiving, by the remote management server from a service provider device that manages the plurality of image forming devices, a request for a change in configuration data for an image forming device; and
if the image forming device is comprised in the list, processing the request according to a preset rule by the remote management server, wherein the preset rule comprises at least one of a rule for rejecting the requested change or a rule for accepting the requested change.

9. The method of claim 8, further comprising:
determining whether the image forming device corresponds to all of the plurality of image forming devices,
wherein the rule for accepting the requested change comprises a first rule for updating the policy with the changed configuration data based on the image forming device corresponding to all of the plurality of image forming devices, and
wherein the rule for accepting the requested change comprises at least one of, based on the image forming device being a part of the plurality of image forming devices:
a second rule for accepting the requested change in the configuration data for the image forming device and updating the policy to remove the image forming device from the list;
a third rule for accepting the requested change in the configuration data for the image forming device, updating the policy to remove the image forming device from the list, and generating a different policy corresponding to the changed configuration data and the removed image forming device; or
a fourth rule for accepting the requested change in the configuration data for the image forming device and querying the service provider device whether to apply the changed configuration data to a remainder of the plurality of image forming devices.

10. The method of claim 9, wherein the fourth rule comprises:
a rule for updating, based on receiving from the service provider device an affirmative response to the query, the policy to apply the changed configuration data to the remainder of the plurality of image forming devices; and a rule for updating, based on receiving from the service provider device a negative response to the query, updating the policy to remove the image forming device from the list and generating a different policy corresponding to the changed configuration data and the removed image forming device.

11. The method of claim 9, wherein the preset rule further comprises a rule for performing, based on the policy being required to be updated, a backup of the policy prior to the update.

12. A service provider device, comprising:
a processor; and
a memory to store instructions that, based on being executed, cause the processor to:
transmit, to a remote management server, a request for generation of a policy comprising configuration data for image forming devices and a list of a plurality of image forming devices for which the configuration data is to be applied;
present a user interface through which a rule for processing a request for a change in the configuration data for the plurality of image forming devices is received;
transmit, based on the received rule, to the remote management server, a request for generation of a preset rule for processing the request for the change; and
receive a request for a change in the configuration data for one of the plurality of image forming devices, wherein the user interface comprises an interface through which at least one of a rule for rejecting the requested change or a rule for accepting the requested change is selectable.

13. The service provider device of claim 12,
wherein the rule for accepting the requested change comprises a first rule for updating the policy with the changed configuration data based on the image forming device corresponding to all of the plurality of image forming devices, and
wherein the rule for accepting the requested change comprises at least one of, based on the image forming device being a part of the plurality of image forming devices:
a second rule for accepting the requested change in the configuration data for the image forming device and updating the policy to remove the image forming device from the list;
a third rule for accepting the requested change in the configuration data for the image forming device, updating the policy to remove the image forming device from the list, and generating a different policy corresponding to the changed configuration data and the removed image forming device; or
a fourth rule for accepting the requested change in the configuration data for the image forming device and querying the service provider device whether to apply the changed configuration data to a remainder of the plurality of image forming devices.

14. The service provider device of claim 13, wherein, based on being executed, the instructions further cause the processor to:
based on the fourth rule being selected, receive the query from the remote management server and transmit an affirmative or a negative response to the query.

15. The service provider device of claim 12, wherein, based on being executed, the instructions further cause the processor to:
transmit, at a periodic interval, to the remote management server, the configuration data for the plurality of image forming device.

\* \* \* \* \*